Figure 1:
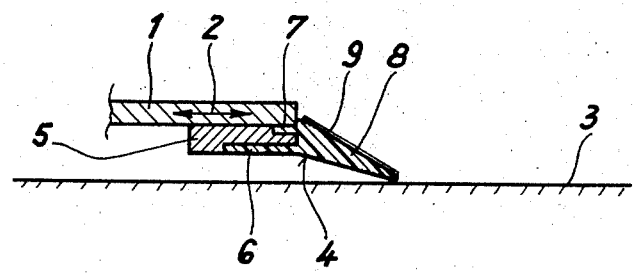

United States Patent
Hennig et al.

[15] 3,691,588
[45] Sept. 19, 1972

[54] STRIPPER DEVICE

[72] Inventors: Arnold Hennig, Erlenstrasse 10, Ismaning 8045; Kurt Hennig, Georgensteinstrasse 16, 8000 Munich 71, both of Germany

[22] Filed: Jan. 28, 1971

[21] Appl. No.: 110,715

[30] Foreign Application Priority Data

Feb. 3, 1970 Germany..........P 20 04 741.0

[52] U.S. Cl. ..................15/256.5, 160/202, 308/3.5
[51] Int. Cl. ..............................................F16c 17/00
[58] Field of Search .........308/3.5; 160/11, 202, 193, 160/223; 161/217, 216, 213, 403, 404; 267/69, 73, 74, 102, 81; 49/309, 489, 475, 496, 484, 488, 303–308; 16/71–77; 92/53; 15/256.5, 210, 245, 210 B, 250.36, 144 B

[56] References Cited
UNITED STATES PATENTS 3,030,692  4/1962  Raynes.....................308/3.5
3,515,444  6/1970  Grabner....................308/3.5

FOREIGN PATENTS OR APPLICATIONS 63,883  5/1955  France.....................308/3.5

*Primary Examiner*—Leon G. Machlin
*Attorney*—Learman & McCulloch

[57] ABSTRACT

A stripper device for attachment to a movable part of a machine tool comprises a strip of resilient material secured to the movable machine part and terminating in a deflectable, exposed lip which is operable to wipe the surface of a fixed part of the machine tool. The lip is protected against damage by hot chips or the like by a layer of metal secured to the strip, the metal layer being sufficiently thin and flexible as to permit deflection of the lip in accordance with variations of the surface over which it moves.

10 Claims, 2 Drawing Figures

3,691,588

INVENTOR:
Arnold Hennig
Kurt Hennig
BY:
Learman & McCulloch

STRIPPER DEVICE

This invention relates to a stripper device, especially for chips and dust, for attachment to a movable part of a machine tool, especially to a machine component movable along a slide track or to telescopically engageable casing members, and having a resilient strip disposed transversely to the direction of movement of the machine component, affixed by a rigid metallic holder to the machine component, and terminating in a stripper lip lying on the slide track or the adjacent casing members.

Stripper devices of the above type are known wherein the rigid metallic holder used for affixing the resilient strip comprises a relatively thick sheet metal strip which is attached to the machine component by screwing, riveting or welding. The leading edge of the resilient strip, which tapers in wedge fashion and constitutes the actual stripper lip, is thus completely free. Though it therefore has the resilience needed for effective stripping, it is to a considerable extent subject to attack by hot chips, which results in rapid wear.

Stripper devices of the type in question are also known wherein the holder for the resilient strip comprises a steel plate which is drawn in the form of tongues, separated by slots, over the upper side of the lip. These tongues are intended to increase the springiness of the stripper lip and also to provide some protection for the lip. In practice, however, it is found that this known stripper device does not meet either of these latter requirements to a satisfactory extent. In order that the steel plate, which is also used as the holder, should have the stiffness needed for attachment, the plate chosen should not be too thin. Consequently, the springiness of the tongues extending from this plate and lying on the left top of the strip is very limited. Also the slots necessarily provided between the tongues enable hot chips to come into contact with the top and leading edge of the lip.

A stripper device is also known wherein in order to protect the stripper lip, the sheet metal strip which also acts as a holder is forwardly advanced over the lip, and under this advanced portion of the metal strip the lip has a cut-away portion which permits resilient movement of the stripper lip perpendicular to the slide track. Because of this cut-away portion the stripper lip has a relatively large height, and consequently the front edge of the sheet metal strip also lies fairly high above the slide track. Consequently, this known stripper device again has the danger that hot chips can come into contact with the stripper lip (i.e., with its leading edge).

The object of the invention is therefore to avoid these disadvantages of known constructions while providing a stripper device of the kind described which provides firstly a full protection of the stripper lip from attack by hot chips and secondly, ensures adequate elasticity in the lip. According to the invention this object is achieved in that the upper side of the lip is provided with a metallic protective layer which is separate from the rigid metallic holder and from the part of the elastic strip which is thereby made rigid, and is so thin and flexible that it does not hinder the movements and deflections of the stripper lip caused during operation.

In distinction from all previously known stripper devices, in the device provided by the present invention the metallic layer provided for protection of the lip surface thus has no connection with the rigid metal holder used for affixing the strip, or with the part of the elastic strip immobilized by this holder. Consequently, the said metallic protective layer can freely follow the individual movements of the stripper lip, especially since the layer in accordance with the invention is made thin and flexible. In this way there is ensured both effective protection of the stripper lip against attack by hot chips (because of the rapid removal of heat caused by the metallic protective layer) and the required inherent resilience in the stripper lip.

According to the invention, the metallic protective lip may comprise a thin metal sheet fixedly attached by vulcanizing, sticking or other method to the resilient material, preferably consisting of plastic. It may be especially advantageous to make this sheet from spring steel, since this further reinforces the elasticity of the stripper lip.

In accordance with the invention, it is, however, also possible to make the metallic protective layer by casting, spraying or vapor deposition. Any of the modern methods may be used whereby thin layers of metal are applied to plastics (or vice versa). In order to achieve especially good heat removal it can be advantageous to apply the protective metallic layer to a surface of the elastic material which has for instance been ribbed, roughened or in any other manner increased.

Two embodiments of the invention are shown schematically in the drawings.

The part 1, indicated only schematically, of a machine tool (FIG. 1) reciprocates in a horizontal direction (arrow 2) on a slide track 3 (parts 1 and 2 may also be telescopically engageable casing members). In order to strip away chips, dust particles and the like foreign bodies which may be on this slide track, there is used a stripper device which consists of a resilient strip 4 and a rigid metal holder 5.

The metal holder 5 is a relatively thick sheet (for example of brass) connected, for instance by vulcanizing, to the strip 4 consisting of resilient plastic such as polyurethane, polyethylene, polyvinyl chloride, or the like. The stripper device consisting of parts 4 and 5 is connected to the machine part 1, for example by welding.

The elastic strip 4 consists of a rear portion 6 intended for attachment to the holder 5 or as an additional support, a tongue 7 serving for further improvement of the attachment, and the actual stripper lip 8 which has a wedge-shaped forward taper and has its leading edge lying on the slide track 3.

In accordance with the invention the upper side of the stripper lip 8 is provided with a protective metallic layer 9 of spring steel or the like, which is made thin and flexible and is not connected to the rigid metal holder 5. This protective layer 9 prevents any damage to the stripper lip 8 from impinging hot chips. However, it also permits free resilient deflection of the stripper lip 8, and in particular does not hinder pivotal movements of the stripper lip 8 about the latter's position of connection to the metal holder 5.

Figure 2:
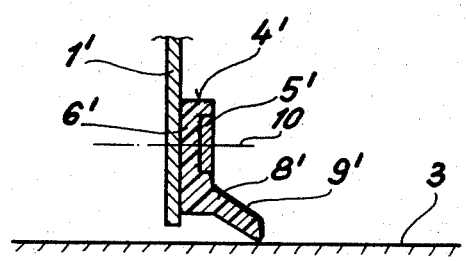

In the further embodiment of the invention shown in FIG. 2, the stripper device is attached, for instance by a screw connection 10, to a vertically disposed machine part 1'. In this case, the rigid metal holder 5', consisting of thick sheet metal, is vulcanized into the elastic strip 4' formed of material similar to that of the strip 4. The strip 4' has its portion 6' lying against the machine part 1'.

In this embodiment, the upper side of the stripper lip 8' is again covered by a thin, flexible, spring steel or other metallic protective layer 9', which in view of the shape of the stripper lip 8' is extended downwards to near the under edge of the stripper lip 8'. From the manufacturing aspect this can be produced by vulcanizing, sticking or otherwise attaching a thin metal sheet to the plastic, or by simply spraying on the metallic protective layer or depositing it from vapor. In this embodiment the metallic protective layer 9' is again not connected to the rigid metal holder 5'. The stripper lip 8' can consequently move freely about its connection point.

We claim:

1. A stripper device adapted for connection to a movable part of machine tool or the like, said device comprising a strip of resilient material terminating at one end in a deflectable lip having an outer surface; means for mounting said strip on said part with said surface exposed; and a layer of metal overlying substantially the whole of said surface and secured to said surface of said lip, said metal layer being supported only by said lip and being sufficiently thin as to be flexible in response to deflection of said lip.

2. The construction set forth in claim 1 wherein said mounting means is rigid.

3. The construction set forth in claim 1 wherein said surface is ribbed.

4. The construction set forth in claim 1 wherein said surface is roughened.

5. The construction set forth in claim 1 wherein said layer of metal is secured to said surface by vulcanizing.

6. The construction set forth in claim 1 wherein said layer of metal is secured to said surface by spraying.

7. The construction set forth in claim 1 wherein said layer of metal is secured to said surface by coating.

8. The construction set forth in claim 1 wherein said layer of metal is secured to said surface by vapor deposition.

9. The construction set forth in claim 1 wherein said strip is composed of plastic material.

10. The construction set forth in claim 1 wherein said metal comprises spring steel.

* * * * *